United States Patent [19]

Anspach, Jr. et al.

[11] Patent Number: 5,427,203

[45] Date of Patent: Jun. 27, 1995

[54] PNEUMATIC TOOL LUBRICATION SYSTEM

[75] Inventors: William E. Anspach, Jr., Palm Beach Gardens; Eddy H. del Rio, Royal Palm Beach, both of Fla.

[73] Assignee: The Anspach Effort, Inc., Palm Beach Gardens, Fla.

[21] Appl. No.: 192,865

[22] Filed: Feb. 7, 1994

[51] Int. Cl.⁶ .............................................. F01M 1/00
[52] U.S. Cl. ................... 184/6.26; 184/55.2; 184/55.1
[58] Field of Search ............... 184/6.26, 6.14, 55.1, 184/55.2, 58

[56] References Cited

U.S. PATENT DOCUMENTS

| | | | |
|---|---|---|---|
| 3,665,684 | 5/1972 | White | 184/55.2 |
| 3,837,432 | 9/1974 | McKendrick | 184/55.1 |
| 4,860,638 | 8/1989 | Hosono et al. | 92/61 |
| 5,125,480 | 6/1992 | Gregory et al. | 184/6.26 |
| 5,318,152 | 6/1994 | Ehlert | 184/6.26 |

*Primary Examiner*—Thomas E. Denion
*Attorney, Agent, or Firm*—Quarles & Brady

[57] ABSTRACT

A pneumatically driven surgical tool is lubricated by a system that includes a lubricator with a reservoir that contains the lubricant. The lubricator also includes an air inlet, an air outlet and a mechanism that mixes lubricant from the reservoir with air flowing from the air inlet to the air outlet. A first conduit connects the lubricator air outlet to the surgical tool and a second conduit is coupled to an exhaust port of the surgical tool. The second conduit is connected to an air inlet opening of a separator that has a mechanism for extracting lubricant from the air flow through the air inlet opening. The lubricant extracted by the separator is fed through a third conduit to the lubricator reservoir thereby recycling the lubricant.

10 Claims, 5 Drawing Sheets

5,427,203

PNEUMATIC TOOL LUBRICATION SYSTEM

BACKGROUND OF THE INVENTION

This invention relates to systems for lubricating a pneumatically-driven surgical tool used in medical operations, and more particularly to systems which introduce lubricants into the compressed airflow which drives the motor.

Different types of surgical tools are driven by compressed air to avoid electrical sparks in a potentially combustible environment of the operating room. The pneumatic motors of such surgical instruments are lubricated via a device that introduces a preset amount of lubricant into the compressed air flow that operates the pneumatic motor. After passing through the motor, the compressed air typically is exhausted into the operating room environment carrying with it the lubricant.

The expulsion of the lubricant with the exhaust air contaminated the environment of the medical operating room. Such contaminants not only may affect the personnel performing an operation, but can be carried into the surgical opening of the patient.

In addition, the expulsion of the lubricant after passing through the motor requires that lubricant supply must be replenished periodically. The operating time of the motor, therefore, is dependent not only on the quantity of lubricant in the lubricator reservoir, but also the feed rate of the lubricant. In order to replenish the lubricant, the motor use must be interrupted, which can be undesirable during a surgical procedure.

SUMMARY OF THE INVENTION

An object of the present invention is to provide a lubricating system for a pneumatic tool in which the lubricant in the exhaust air from the tool is recovered and returned to the lubricator. Such recovery reduces the amount of lubricant expelled into the environment.

Another object of the present invention is to provide a mechanism for recirculating the recovered lubricant back to the supply reservoir for the lubricating mechanism. This reduces the frequency at which the lubricant in the supply reservoir must be replenished and prolongs the operating time of the tool.

These objectives are achieved by a lubrication system which comprises a lubricator having a reservoir with a lubricant inlet. An air inlet of the lubricator receives compressed air from a source and a mechanism is provided to mix lubricant from the reservoir with air flowing from the air inlet to an air outlet. A first conduit connects the air outlet to an inlet port of the surgical tool and a second conduit is coupled to an outlet port of the surgical tool.

A separator has an inlet opening connected to the second conduit and an air outlet opening. A mechanism within the separator extracts lubricant from an fluid flow between the inlet opening and the air outlet opening. A lubricant outlet in provided through which extracted lubricant exits the separator. A third conduit connects the lubricant outlet of the separator to the lubricant inlet of the lubricator.

DETAILED DESCRIPTION OF THE INVENTION

Figure 1:
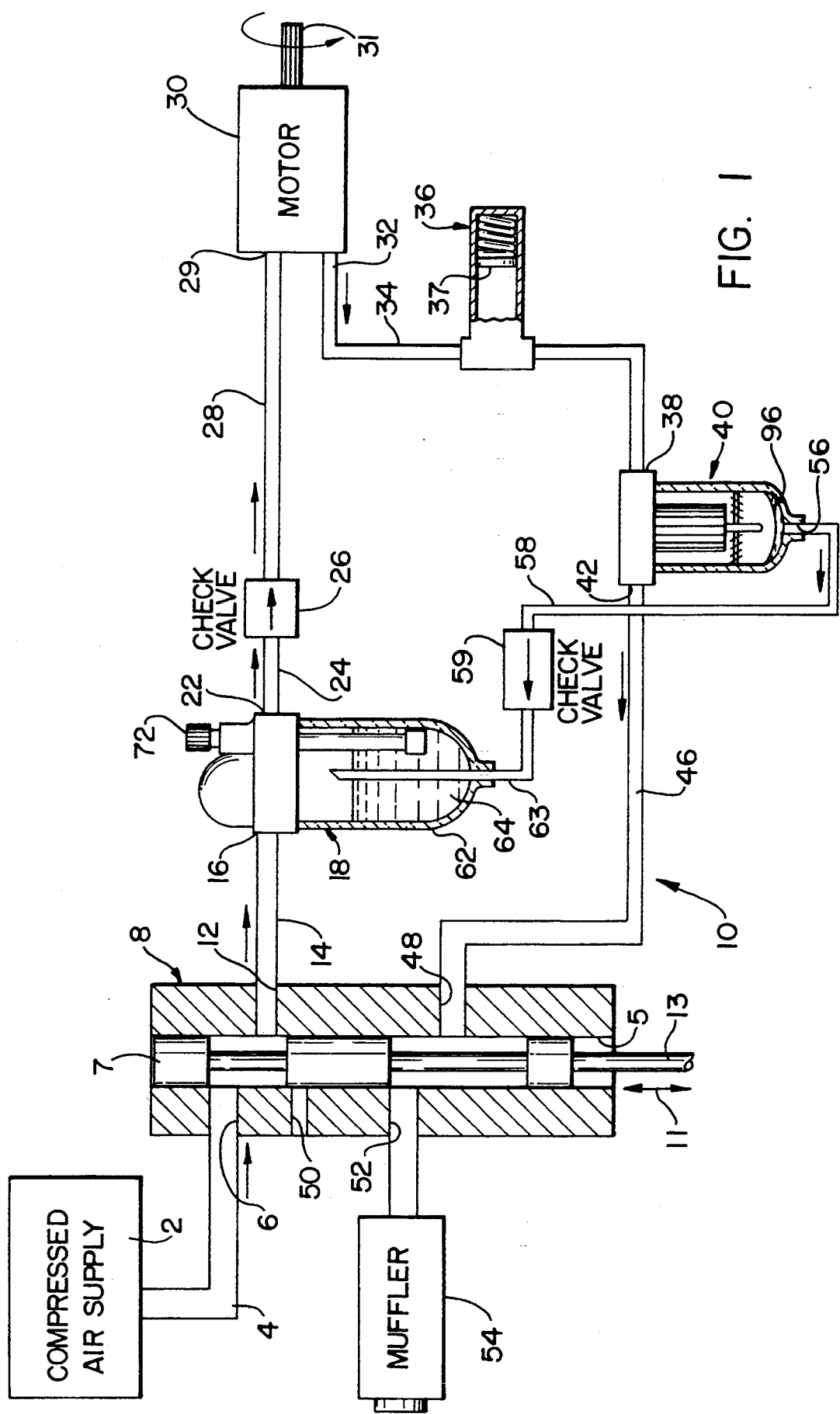
FIG. 1 is a schematic of a pneumatic tool lubricating system according to the present invention with the control valve in the on position.

With initial reference to FIG. 1, a lubrication system 10 for lubricating a pneumatic operated device, such a motor 30, receives air from a compressed air supply 2 which may be a conventional air compressor or a compressed air tank if portable operation is desired. The compressed air from supply 2 is directed through conduit 4 to an inlet 6 of a dual air control valve 8. Specifically, the inlet 6 communicates with longitudinal bore 5 through the valve within which is located a valve piston 7. The piston 7 moves within the bore 5 in directions indicated by arrow 11 to turn on and off the motor 30 being driven by the compressed air.

With the dual air valve 8 in the "on" state, the position of piston 7, as shown in FIG. 1, allows air to flow from the inlet 6 through bore 5 exiting through an outlet 12. A conduit 14 couples the air flowing from the outlet 12 to an inlet 16 of a lubricator 18. Arrows with single heads in the drawings indicate the direction of fluid flow.

Figure 3:
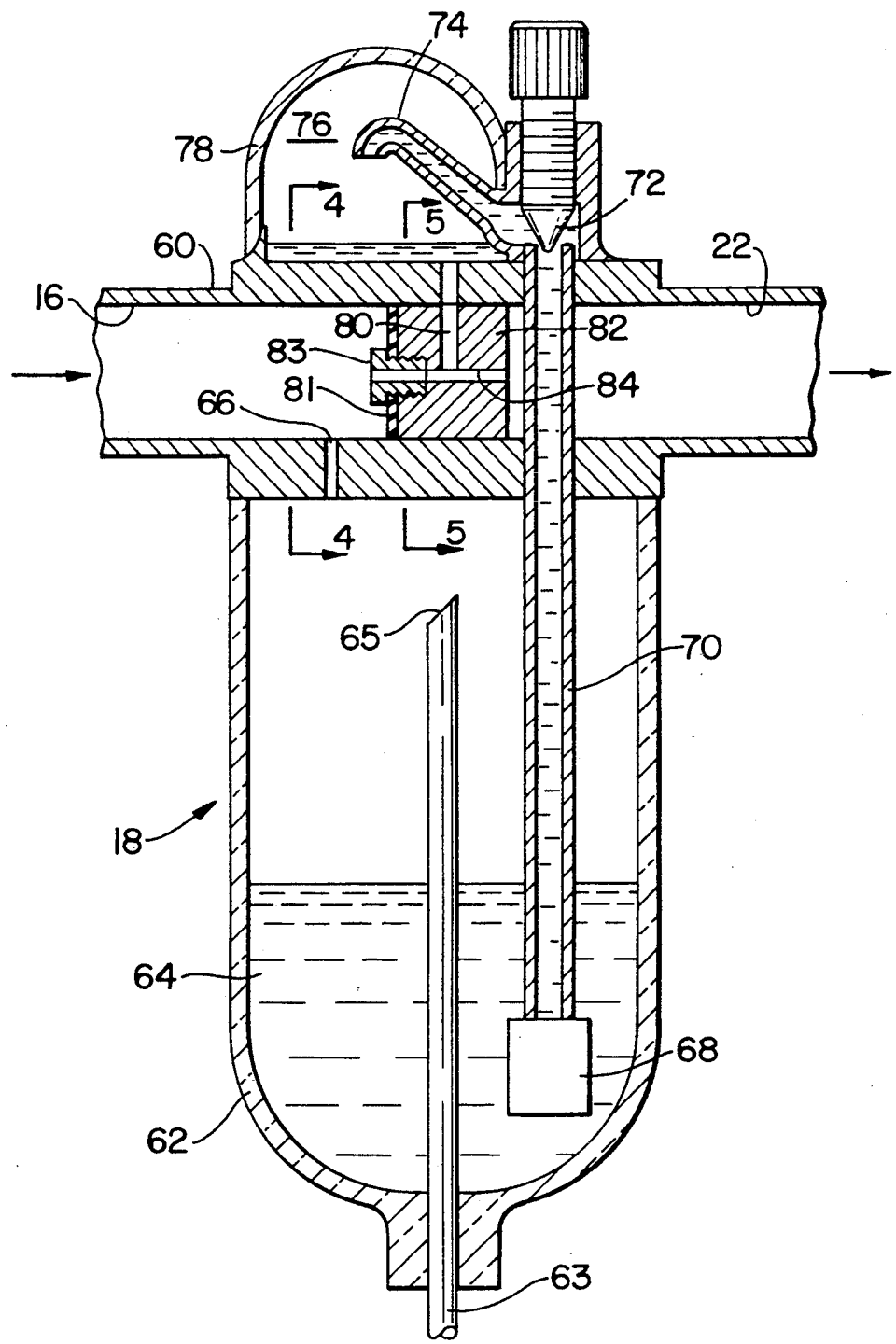
FIG. 3 is a cross sectional view through the lubricator of the system in FIG. 1.

With reference to FIGS. 1 and 3, the lubricator 18 contains a housing 60 to which is attached a reservoir 62 formed of a clear plastic material enabling the user to observe the level of the lubricant 64 therein. As compressed air enters the lubricator 18 through inlet 16, a portion of the air flow is directed through an lubricant pressurizing orifice 66 and downward into the reservoir 62. This flow of compressed air exerts pressure on the upper surface of the lubricant 64, forcing the lubricant through a filter 68 and upward through feed tube 70. At the upper end of feed tube 70 is a needle control valve 72 which is threaded into an aperture through lubricator housing 60. By controlling the relationship of the tip of the needle valve 72 with the upper opening of feed tube 70, the amount of lubricant flowing through the tube can be controlled, thereby regulating the feed rate at which lubricant is introduced into the air flow through the lubricator 18. The lubricant flows past the needle valve 72 through a drip spout 74 and into a supply chamber 76 which is formed by a dome 78 attached to the upper surface of lubricator housing 60.

Figure 4:
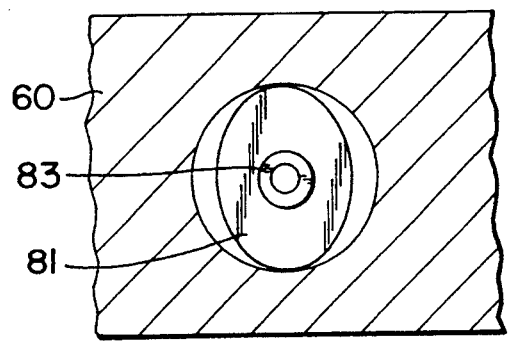
FIG. 4 is a cross sectional view taken along line 4—4 in FIG. 3.
Figure 5:
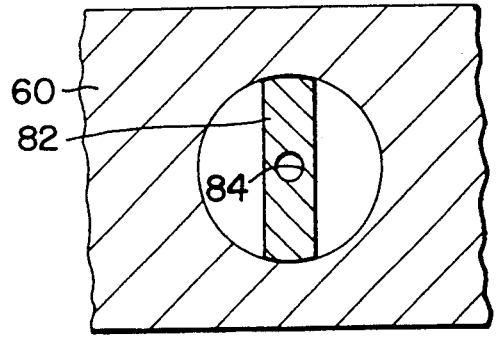
FIG. 5 is a cross sectional view taken along line 5—5 in FIG. 3.
Figure 6:
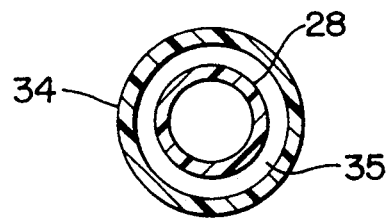
FIG. 6 is a transverse cross sectional view through a coaxial pneumatic hose which carries air to and from the motor in FIG. 1.

The lubricant from supply chamber 76 flows downward through a supply passage 80 in the lubricator housing 60 and into a venturi body 82 located the central one-third of the passage between inlet 16 and outlet 22, as shown in FIG. 5. The venturi body 82 has a mixing orifice 84 therethrough to which the supply passage 80 communicates. A disk-shaped resilient diaphragm 81 is attached to the inlet side of venturi body 82 by a hollow bolt 83 threaded into the mixing orifice 84. As the compressed air flows into the inlet 16, the diaphragm 81 is folded around the venturi body 82 opening passages 85 on either side of the body as shown in FIG. 4. Some of the air flows through the mixing orifice 84 drawing lubricant through supply passage 80 which becomes mixed with the air as it continues to flow toward the outlet 22. The lubricant flows from the supply chamber 76 through passage 80 as a result of both gravity and the Bernoulli effect produced by orifice 84 in the venturi body 82.

A pressure differential is produced on opposite sides of the diaphragm 81 which results in air flowing downward through orifice 66 into the reservoir 62. The orifice 66 has a relatively small cross-section so that the flow of compressed air does not sputter the lubricant supply 64.

Referring again to FIG. 1, the air-lubricant mixture is directed through the outlet 22 of the lubricator 18 into conduit 24 and through a first one-way check valve 26. The first check valve 26 prevents the air-lubricant mixture from flowing backwards into the lubricator 18 when the valve 8 is placed in the "off" state, as will be described. The lubricated air mixture then flows through conduit 28 which is connected to the inlet port 29 of the pneumatic motor 30, such as used in a pneumatically-operated surgical tool. The air-lubricant mixture drives and lubricates the internal components of the pneumatic motor 30, producing rotation of a shaft 31. The air-lubricant mixture then exits the pneumatic motor 30 through an exhaust port 32 and flows into conduit 34.

An accumulator 36 is located in conduit 34 between the motor 30 and a lubricant separator 40. The accumulator has a spring loaded diaphragm 37 which is compressed to increase the volume of the accumulator chamber in response to increases in the back air pressure from the separator 40.

For convenience, the inlet and outlet conduits 28 and 34 for the motor 30 may be a single coaxial hose structure shown in FIG. 4. The air inlet conduit 28 is a centrally-located tube within the hose and the outlet conduit 34 is coaxially around the inlet conduit forming a gap 35 therebetween through which the exhaust from the motor 30 passes. In the preferred embodiment, the material which forms the outer wall of exhaust conduit 34 is a flexible rubber which expands and contracts with increases and decreases in the pressure of the exhaust. In this type of hose structure, the separate accumulator device 36 can be dispensed with since the elasticity of the outer wall of conduit 34 provides a mechanism by which the volume for the air between the motor and the separator 40 changes with rise and fall of the pressure.

Figure 8:
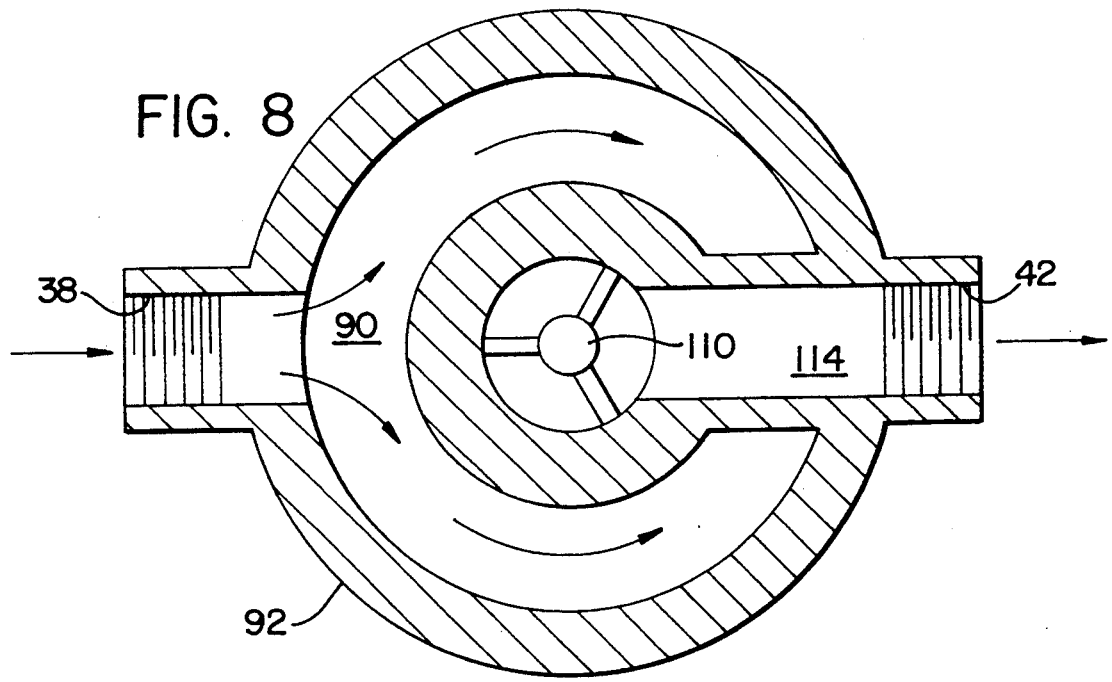
FIG. 8 is a cross sectional view taken along line 8—8 in FIG. 7.
Figure 7:
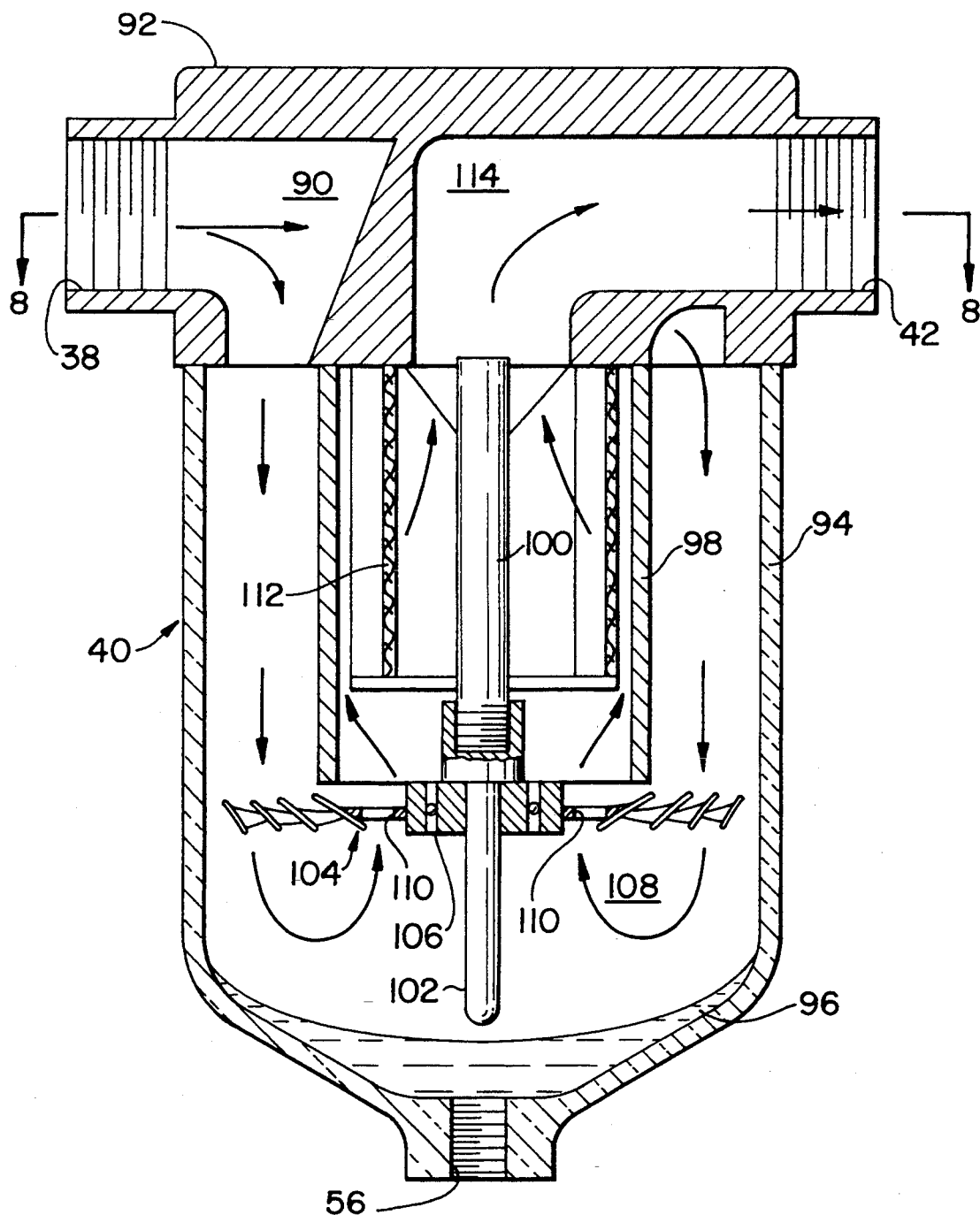
FIG. 7 is a cross sectional view through the lubricant separator of the lubricating system.

The tool exhaust continues flowing into the inlet opening 38 of the lubricant separator 40 which removes the lubricant from the exhaust. As shown in FIGS. 7 and 8, the air-lubricant mixture of the tool exhaust enters the inlet opening 38 and is directed into a circular, inlet passage 90 formed in the body 92 of the separator 40. The exhaust is forced by the curved passage walls into a cyclonic flow path through an annular opening 91 in the lower surface 93 of the body 92 and downward into a bowl 94 which extends from the body. The body and bowl form the housing of the separator. A tubular partition 98 is attached to the lower surface 93 of body 92 inside the annular opening 91 and projects into a cavity 97 in the bowl 94. An annular chamber 99 is defined in cavity 97 between the partition 98 and the wall 95 of the bowl 94 through which the exhaust flow is directed downward into the bowl in a cyclonic path. The cyclonic flow path forces the lubricant particles against the wall 95 causing extraction from the air flow. The lubricant, which is extracted from the air flow by centrifugal force, flows down the inner surface of wall 95 and forms a pool 96 at the bottom of the bowl.

The separator body 92 has a central post 100 which projects downward into the bowl cavity 97 and has a threaded section at its remote end. A shaft 102 is threaded onto the remote end of post 100 and a turbine 104 is mounted on a bearing 106 that is press fitted onto the shaft. The bearing 106 allows the turbine 104 to rotate about the shaft in a horizontal plane in the orientation of the separator 40 shown in FIG. 7. As the compressed air-lubricant mixture flows downward through the bowl 94, it strikes blades 108 on the outer periphery of the disk-shaped turbine 104. The blades 108 direct the air-lubricant mixture at an angle producing a rotation of the turbine 104 about shaft 102. The impingement of the air-lubricant mixture with the turbine blades 108 deposits lubricant on the blade surfaces and the rotary action of the turbine expels the lubricant against the inner wall 95 of the bowl.

After flowing downward through the spinning turbine blades, the exhaust reverses direction flowing upward through openings 110 in the central portion of the turbine 104 from which portion the blades 108 extend. The 180° turn of the fluid flow expels additional lubricant into the pool 96 at the bottom of the bowl 94. The openings 110 are intermittently spaced circumferentially around this central portion so that the exhaust flow at any given point adjacent shaft 102 is periodically interrupted by solid ribs of the central portion of the turbine 104. This periodic interruption of the air flow creates additional turbulence that aids in lubricant separation from the exhaust air.

As the compressed exhaust air flows upward through the central portion of the turbine 104, it enters the inner region 115 within partition 98 and passes through a conventional filter 112 which removes particulates from the air flow. The air then is directed toward the center post 100 of the upper body 92 and re-enters the body 92 through a central opening 115 that is coaxially within the annular opening 91. The central opening 115 in the lower surface 93 of the body 92 opens into an outlet passage 114 which communicates with the outlet opening 42. Thus the exhaust air enters the outlet passage 114 through central opening 115 and exits the separator 40 through the outlet opening 42.

Referring once again to FIG. 1, the air flows from outlet 42 of separator 40 through conduit 46 into an exhaust inlet 48 of the dual air valve 8. In the "on" position of piston 7, the air entering the exhaust inlet 48 flows through the inner bore 5 to an exhaust outlet 52 that is connected to a conventional muffler 54. The air exits the muffler being exhausted into the ambient environment of the operating room.

The recovered lubricant 76 which collects at the bottom of the separator bowl 94 is forced by the air pressure in cavity 97 through a fluid outlet 56 in the bottom of the bowl and through conduit 58. The recovered lubricant flows through a second one-way check valve 59 and a tube 63 that passes through an opening in the bottom of the reservoir 62 of the lubricator 18. The second check valve 59 prevents lubricant from being drawn from the lubricator 18 through tube 63 should a pressure reversal occur. As shown in detail in FIG. 3, tube 63 extends into the bowl 62 of the lubricator 18 and terminates in the upper section of the bowl at an open end 65. The recovered lubricant is ejected from the open end 65 and flows downward into the lubricant pool 64 in the lower section of the reservoir. Introducing the recovered lubricant into the upper section of the reservoir 62 which is normally filled with air, avoids variation of the hydrostatic pressure of the lubricant, which otherwise might occur if the lubricant was ejected directly into the bottom of the lubricant pool 64. This recycling of the lubricant which is recovered by separator 40 replenishes the lubricant supply in lubricator 18. It has been found that over ninety percent of the lubricant passing through the motor 30 can be recovered by the separator 40 and returned to the supply reservoir 62 of the lubricator 18.

Figure 2:
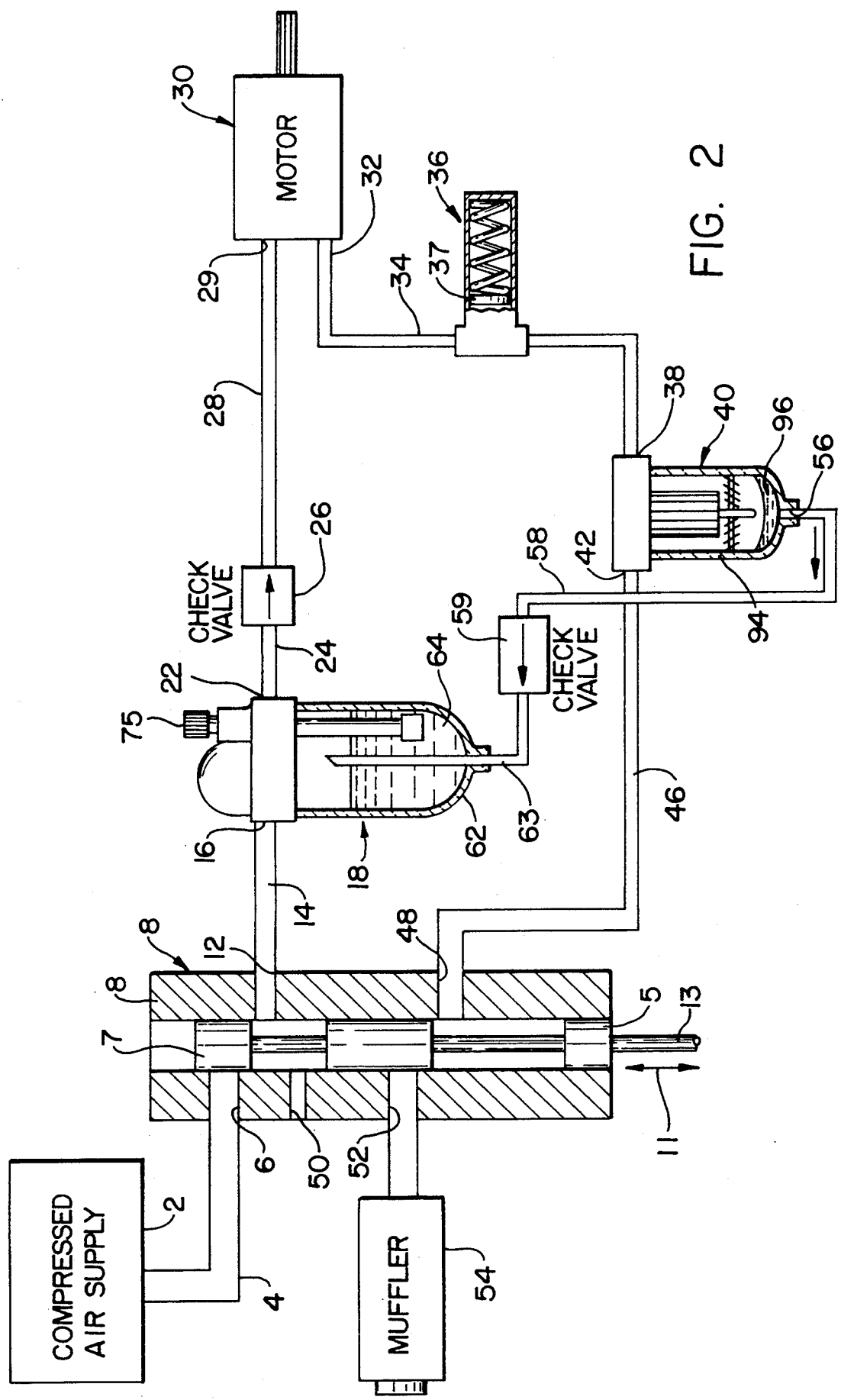
FIG. 2 is a schematic diagram similar to FIG. 1 with the control valve in the off position.

With reference to FIG. 2, when the valve 8 is placed in the "off" position, an enlarged portion of the piston 7 closes the opening between inlet 6 and the bore 5 of the valve. This action terminates the flow of compressed air from supply 2 to the lubricator 18, thus stopping movement of motor 30. Another enlarged portion of the piston 7 blocks the opening between the exhaust outlet 52 and the central bore 5 of the valve 8 in the "off" position, preventing air from flowing from the separator 40 to the muffler. In this state, the pressure within the exhaust conduit 34 and accumulator 36 is released through the separator 40 by forcing recovered lubricant 76 through conduit 58, the second check valve 59 and tube 63 into the reservoir 62 of the lubricator 18. This action returns a significant amount of the remaining recovered lubricant to the lubricator 18 when the motor is turned off. This return action is aided by the position of valve piston 7 opening a passage through bore 5 between the air outlet 12 and an open relief port 50. Thus, the air pressure in the upper sections of the lubricator 18 is released through this passage in the dual air valve 8 providing a reduced pressure that aids in the return of lubricant to the lubricator. It should be noted that the first check valve 26 in this state prevents the air pressure in the motor from being released directly through the lubricator 18 rather than through the separator 40.

We claim:

1. A lubrication system for a pneumatically driven device, which system comprises:
    a lubricator having a reservoir for containing a lubricant, a lubricant inlet in communication with the reservoir, an air inlet for receiving compressed air from a source, and an air outlet, and said lubricator further having a mechanism for mixing lubricant from the reservoir with air flowing from the air inlet to the air outlet;
    a first conduit for connecting the air outlet of said lubricator to an inlet port of the pneumatically driven device;
    a second conduit for connecting to an outlet port of the pneumatically driven device;
    a separator having an inlet opening connected to said second conduit, an air outlet opening, a mechanism which extracts lubricant from air flowing between the inlet opening and air outlet opening, and a lubricant outlet through which extracted lubricant flows;
    an accumulator in series with the second conduit between the pneumatically driven device and said separator; and
    a third conduit connecting the lubricant outlet of said separator to the lubricant inlet of said lubricator.

2. The lubrication system as recited in claim 1 wherein said second conduit is located coaxially around said first conduit and is fabricated of an elastic tubular material that expands and contracts in response to changes in pressure within said second conduit thereby acting as an accumulator.

3. The lubrication system as recited in claim 1 further comprising a check valve located in series with said third conduit to prevent lubricant from flowing through said third conduit from said lubricator to said separator.

4. The lubrication system as recited in claim 1 wherein the lubricant inlet is formed by a tube extending through a wall of said lubricator and having a open end located above a level of lubricant in the reservoir.

5. The lubrication system as recited in claim 1 further comprising:
    a first check valve located in series with said first conduit to prevent fluid from flowing from the tool to said lubricator; and
    a second check valve located in series with said third conduit to prevent lubricant from flowing from said lubricator to said separator.

6. The lubrication system as recited in claim 5 further comprising a valve having a supply inlet for receiving compressed air from a source, a supply outlet being connected to the air inlet of said lubricator, an exhaust inlet connected to the air outlet opening of said separator, an exhaust outlet and a pressure relief outlet, wherein said valve has a first state in which the supply inlet is connected to the supply outlet and the exhaust inlet is connected to the exhaust outlet, and has a second state in which the supply outlet is connected to the pressure relief outlet, the air inlet is closed and the exhaust outlet is closed.

7. A lubrication system for a pneumatically driven tool, which system comprises:
    a valve having a supply inlet for receiving compressed air from a source, a supply outlet, an exhaust inlet, an exhaust outlet and a pressure relief outlet, wherein said valve has a first state in which the supply inlet is connected to the supply outlet and the exhaust inlet is connected to the exhaust outlet, and has a second state in which the supply outlet is connected to the pressure relief outlet and both the air inlet and the exhaust outlet are closed;
    a lubricator having a reservoir for containing a lubricant, a lubricant inlet in communication with the reservoir, an air inlet connected to the supply outlet of said valve, and an air outlet, and said lubricator further having a mechanism for mixing lubricant from the reservoir with air flowing from the air inlet to the air outlet;
    a first conduit for connecting the air outlet of said lubricator to an inlet port of the tool;
    a second conduit for connecting to an outlet port of the tool;
    a lubricant separator having an inlet opening connected to said second conduit, an air outlet opening in communication with the chamber, a mechanism for separating lubricant from an air flow entering the inlet opening, and a lubricant outlet through which separated lubricant flows; and
    a third conduit connecting the lubricant outlet of said lubricant separator to the lubricant inlet of said lubricator.

8. The lubrication system as recited in claim 7 further comprising;

a first check valve located in series with said first conduit to prevent fluid from flowing from the tool to said lubricator; and a second check valve located in series with said third conduit to prevent lubricant from flowing from said lubricator to said separator.

9. The lubrication system as recited in claim 7 further comprising an accumulator in series with the second conduit between the pneumatically driven tool and said separator.

10. The lubrication system as recited in claim 7 wherein said second conduit is located coaxially around said first conduit and is fabricated of an elastic tubular material that expands and contracts in response to changes in pressure within said second conduit thereby acting as an accumulator.

* * * * *